United States Patent [19]

Goodstine et al.

[11] 4,416,418
[45] Nov. 22, 1983

[54] FLUIDIZED BED RESIDENTIAL HEATING SYSTEM

[76] Inventors: Stephen L. Goodstine, 691 Kennedy Rd.; Brian C. Jones, 258 Mountain Rd., both of Windsor, Conn. 06095

[21] Appl. No.: 354,151

[22] Filed: Mar. 5, 1982

[51] Int. Cl.³ .......................... F24H 1/22; F22B 1/00
[52] U.S. Cl. ........................................ 237/19; 237/18;
  237/56; 122/4 D; 122/13 A; 219/378; 110/245
[58] Field of Search ............ 122/4 D, 13 A; 110/245;
  431/7, 170; 219/378; 237/18, 19, 56

[56] References Cited

U.S. PATENT DOCUMENTS

| | | | |
|---|---|---|---|
| 1,996,625 | 4/1935 | Pendleton | 122/13 A |
| 2,670,425 | 2/1954 | Stone | 219/378 |
| 2,670,426 | 2/1954 | Stone | 219/378 |
| 3,068,812 | 12/1962 | Hemeon | 110/245 |
| 3,250,521 | 5/1966 | Sergent | 219/365 |
| 3,884,193 | 5/1975 | Bryers | 122/4 D |
| 4,324,544 | 4/1982 | Blake | 110/245 |
| 4,325,327 | 4/1982 | Kantesaria et al. | 122/4 D |
| 4,355,601 | 10/1982 | Hattiangadi | 110/245 |

Primary Examiner—Henry C. Yuen

[57] ABSTRACT

A fluidized bed combustion system particularly suitable for use in a residential heating system comprising a fluidized bed combustor housing a combustion chamber wherein crushed fuel is burned to generate hot flue gas, a heat exchanger disposed outside of the combustor in the flow path of the flue gas, a particulate collector for removing fine particles entrained in the flue gas before the flue gas is vented to the atmosphere, and an induced draft fan for venting the flue gas to the atmosphere and drawing fluidizing air and recirculated flue gas through the combustion chamber. The combustor is uncooled and heavily insulated so as to provide a substantially adiabatic combustion chamber therein in order to minimize heat loss therefrom. Electric heating means are disposed within the fluidizing region of the combustion chamber to provide the capability of heating the slumped bed during shutdown to maintain bed temperature above the ignition point. The operating temperature of the bed is maintained below the ash softening temperature of the coal by selectively controlling the amount of flue gas recycled.

2 Claims, 1 Drawing Figure

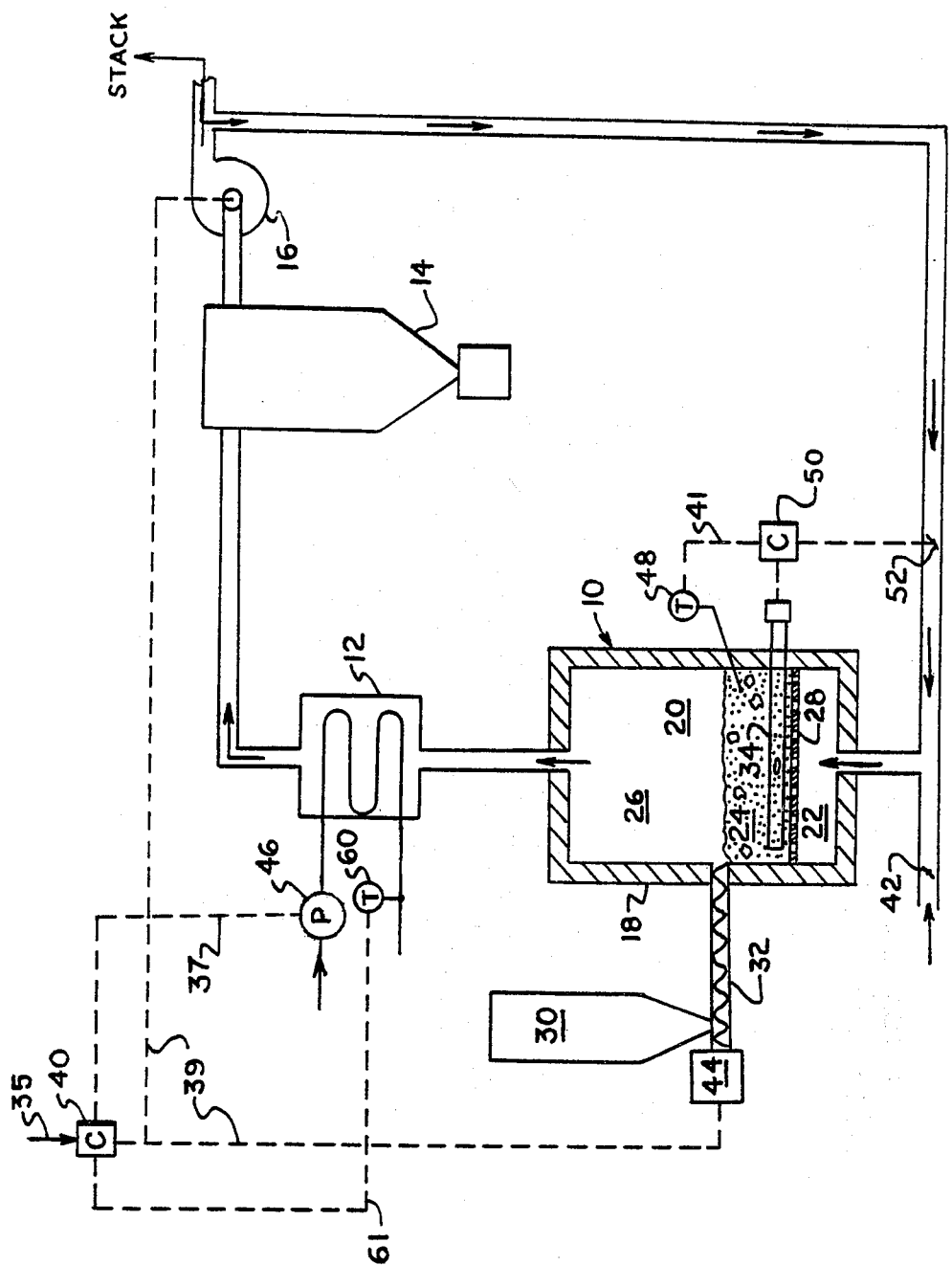

FLUIDIZED BED RESIDENTIAL HEATING SYSTEM

BACKGROUND OF THE INVENTION

The present invention relates to fluidized bed combustors in general and, more particularly, to a fluidized bed combustion apparatus specifically adapted for intermittent operation and rapid start-up, and to a method for operating same in a residential heating system.

The use of coal for residential heating is increasing as the availability of oil and natural gas decreases and the price of oil and nature gas increases. Coal stoves, whether batch fed or stoker fed, are not very efficient. The relatively poor controlability of air to coal stoichiometry typical of coal stoves results in high carbon loss and high stack heat loss. Further, the need to maintain a smoldering fuel bed during periods of no heating demand, such as overnight, in order to ensure rapid response upon the call for heat, results in a wasteful consumption of fuel.

Fluidized bed combustion is well known in the art as providing a very efficient and simple method of burning coal. In a typical fluidized bed combustor, a particulate fossil fuel, such as coal, is introduced into a bed of particulate material disposed in a chamber above a perforated or slotted bed support plate. Fluidizing air, which also serves as combustion air, is introduced into the bed upwardly through the bed support plate. The velocity of the fluidizing air is maintained above the minimum fluidization velocity of the bed material, that is, above that velocity at which the entire bed of particulate material is suspended or floated by the fluidizing air above the bed support plate. Typically, heat exchange tubes are immersed within the bed to effect heat transfer from the combustion process to a heat exchange medium, most commonly water, flowing through the tubes. In some instances, heat exchange tubes may also be disposed in the freeboard region directly above the fluidized bed.

Fluidized bed combustors are increasingly being utilized as furnaces for steam generators to produce superheated steam for process heating and electric power generation. In such a furnace, crushed or pulverized coal is typically mixed with a sulfur sorbent for absorbing sulfur oxides formed during the combustion process. The particulate material making up the bed consists of unburned coal, fresh and spent sulfur sorbent, and residual ash from the already burned coal. The fluidizing air serves as combustion air. Water circulating through tubes forming the furnace walls and heat exchange tubes immersed therein is partially evaporated therein to form a steam and water mixture. The steam is then separated from the water and again passed in heat exchange relationship with the combustion gases produced in the bed for superheating.

Unfortunately, prior art fluidized bed furnaces, such as those utilized for steam generators, are not suitable for applications to residential or small industrial heating applications. For either space heating or small industrial process heating applications, rapid response to heating load demand and rapid cycling capability is critical. The furnace must be adapted for intermittent operation with rapid start-up capability after relatively short or extended periods of shut-down. The prior art fluidized bed furnaces are generally very sluggish in response and incapable of rapid start-up as the particulate bed must typically be preheated to ignition temperature prior to restarting the bed after shutdown, or the bed maintained in a smoldering state as in a coal stove.

SUMMARY OF THE INVENTION

It is therefore an object of the present invention to provide a fluidized bed combustion system capable of cycling operation with rapid start-up capability.

It is a further object of the present invention to provide a fluidized bed combustion system uniquely suitable for residential home heating application.

It is a still further object of the present invention to provide a fluidized bed combustor wherein bed temperature is controlled and maintained during cycling operation within preselected temperature limits during both on-line and shutdown modes.

Toward the fulfillment of these and other objects, the fluidized bed combustion system of the present invention comprises a fluidized bed combustor housing a combustion chamber wherein crushed fuel is burned to generate hot flue gas, a heat exchanger disposed outside of the combustor in the flow path of the flue gas, a particulate collector for removing fine particles entrained in the flue gas before the flue gas is vented to the atmosphere, and an induced draft fan for venting the flue gas to the atmosphere and drawing fluidizing air and recirculated flue gas through the combustion chamber.

In accordance with the present invention, the combustor is uncooled and heavily insulated so as to provide a substantially adiabatic combustion chamber therein in order to minimize heat loss thereform and thereby maintain bed temperature above a preselected lower limit, particularly during the shutdown mode of cycling operation. Further, electric heating means are disposed within the fluidizing region of the combustion chamber to provide the capability of heating the slumped bed during shutdown to maintain bed temperature above the preselected lower limit.

Further, means are provided for recycling flue gas, which has passed through the downstream heat exchanger and particulate collector, thereby being cooled and cleaned. The recirculated gas is mixed with the incoming fluidizing air and the mixture passed through the fluidizing region of the combustion chamber. As the mixture traverses the fluidizing region it absorbs heat therefrom thereby cooling the bed. By selectively controlling the amount of flue gas recycled, the bed temperature is maintained at preselected operating temperature.

Preferably, the bed material includes highly abrasive refractory particulate such as, but not limited to, sintered aluminum oxide particles. As these abrasive particles circulate in the turbulent eddies in the fluidized bed, they impact upon coal ash particles gradually attriting the ash particles into fine particulate which is entrained in the flue gas generated in the bed and carried out of the combustion chamber by the flue gas. Therefore, ash is continuously removed from the bed in the flue gas and collected in the downstream particulate collector.

BRIEF DESCRIPTION OF THE DRAWING

Other objects and advantages of the invention will be evident and more fully appreciated from the following description and the accompanying figure which shows in schematic form a preferred embodiment of a fluidized bed combustion system designed in accordance with the present invention.

DESCRIPTION OF THE PREFERRED EMBODIMENT

Referring to the drawing, there is illustrated therein a fluidized bed combustion system wherein crushed coal is burned in a fluidized bed combustor 10 to generate hot combustion products, termed flue gas. The hot flue gas leaving the fluidized bed combustor 10 is passed over heat exchanger 12 in indirect heat exchange relationship with water passing therethrough so as to cool the flue gas and heat the water. The cooled flue gas is then passed through a particulate collector 14 and vented to the atmosphere through a chimney stack (not shown). An induced draft fan 16, disposed downstream of the particulate collector 14, induces by suction the flow of fluidizing air and recirculated gas into the combustor 10 and the flow of combustion products therefrom over the heat exchanger 12 and through particulate collector 14 and thence forces the flue gases up the chimney stack to the atmosphere.

The combustion chamber 20 of the fluidized bed combustor 10 is encased by a highly insulated housing 18 so as to minimize heat loss from the combustor through the housing thereby providing a substantially adiabatic combustion chamber. As will be discussed later in more detail, a substantially adiabatic combustion chamber is necessary to ensure minimal heat loss from the bed during shutdown of the combustor 10.

The combustion chamber 20 is divided into three regions: an inlet plenum 22, a fluidized bed region 24, and a freeboard region 26. A bed support plate 28, disposed in the lower region of the chamber 20, defines the boundary between the bed region 24 and the inlet plenum 22. Fluidizing medium, i.e. a mixture of air and recirculated flue gas, enters plenum 22 and passes therefrom upwardly into the bed region 24 through a distribution means 28 shown as, but not limited to, a perforated or slotted bed support bed. The velocity of the fluidizing medium is maintained above the minimum fluidization velocity so as to float or suspend the solid particles making up the bed in a fluidized state within the bed region 24.

The fluidized bed region 24 is shown in the drawing as being occupied by a fluidized mass of solid particles. This suggests the normal operation of the bed, in which the fluidization creates a quasiliquid mass having a more or less definite upper boundary above and adjacent to which extends the freeboard region 26. The freeboard region provides a space in which uncombusted solid fuel and inert bed particles carried upward from the bed can execute a complete trajectory and fall under the force of gravity into the bed. The freeboard region thereby ensures that only relatively fine particles will be entrained in the flue gas and drawn out of the combustion chamber.

In order to operate the combustor 10, induced draft fan 16 draws air and recirculated flue gas into the inlet plenum 22 and through the fluidizing region 24 to fluidize the particulate material contained therein. Crushed coal is fed to the bed of fluidized particulate from storage hopper 30 through feed means 32. Because of the turbulence existing in the fluidized bed, the crushed coal fed to the bed is circulated within the bed wherein substantially complete combustion of the coal occurs.

As the coal particle combusts, an ash residue is formed which is also fluidized in the fluidized bed region 24. Thus, at any instance, the fluidized bed is formed of unburned coal particles, coal ash particles and additional inert particulate material. The bed is composed substantially of the inert particulate material with the unburned coal constituting only a small percent of the bed mass. In accordance with one aspect of the present invention, the inert particulate material is a highly abrasive refractory material such as, but not limited to, sintered aluminum oxide particles. As the highly abrasive inert particles circulate in the turbulent eddies of the fluidized bed, they impact coal ash particles and because of their abrasiveness gradually attrit the coal ash particles into small fines which subsequently become entrained in the flue gas generated in the bed and then carried out of the combustion chamber 20 in the flue gas leaving the combustor. The ash particles are then removed from the flue gas as it passes through the particulate collector 14 disposed downstream of the combustor. Thus, ash is continuously removed from the bed and the ash inventory in the bed controlled without the necessity of periodically draining hot particulate material from the bed as is the practice in conventional fluidized bed combustors.

As mentioned previously in the discussion of the prior art, heat exchange tubes are typically immersed within the fluidized bed or disposed directly thereabove in the freeboard region as a means of effecting heat transfer from the flue gas generated in the bed to a fluid to be heated, most commonly water, passing through the heat exchange tubes. Any heat exchange tubes disposed within the combustion chamber of a fluidized bed act as a heat sink even when the bed is shutdown. This results in a heat loss from the combustion chamber and a cooling of the bed during shutdown. Also, any heat picked up by water in the immersed tubes would be rejected to the house even though no heat is called for. However, in the present invention, an objective is to provide a fluidized bed combustor capable of cycling operation with rapid startup, thus any heat loss from the chamber and consequent cooling of the bed is highly undesirable.

In accordance with an additional aspect of the present invention, all heat exchange surface 12 is disposed in the flow path of the flue gas generated in the combustion chamber 10 at a location outside of and downstream of the combustor 10. Ergo, there is no heat transfer surface located within the combustor 10, neither in the fluidized bed region 24 nor the freeboard region 26, to act as a heat sink during shutdown and thereby destroy the substantially adiabatic characteristic of the combustor 10.

Further, a heating means 34 of the electrical resistance type, shown as but not limited to heating coil 34, is disposed within the fluidized bed region 24 of the combustion chamber 20. Despite the substantially adiabatic characteristic of the combustor 10 of the present invention, there will be some unavoidable leakage of heat from the combustor during prolonged periods of shutdown. During such periods, the heating coil 34 is energized in response to bed temperature whenever the bed temperature drops below a preselected desired temperature so as to maintain the bed above the ignition temperature. Additionally, the heating coil can be used to bring the bed of inert particles up to temperature during a cold start-up after an extremely prolonged period of shutdown such as when the fluidized bed combustor of the present invention is utilized in a residential heating system and is activated after summer shutdown.

As no heat transfer surface is disposed in the fluidized bed region 24 of the combustor of the present invention, a means must be provided for cooling the bed in order to prevent the bed temperature from rising above the softening temperature of the ash particles in the bed during the combustion process. One method of controlling bed temperature is to control the flow of fluidizing medium through the bed. For a given heat release in the combustor, i.e. for a given coal feed rate, the bed temperature can be maintained within a preselected operating range by controlling the flow of fluidizing medium through the bed.

Where air is the only fluidizing medium, increasing the air mass flow rate to cool the bed results in a loss of overall efficiency. The air cools the bed by absorbing heat therefrom. Unfortunately, the increased air mass flow also means more heat being carried up the stack in the resultant combustion products, thereby lowering efficiency.

In accordance with the present invention, cooled flue gas is recycled to the inlet plenum 22 and mixed with the fluidizing air being supplied to the combustor to maintain bed temperature at a preselected temperature below the ash softening temperature of the coal particles in the bed. By adding cooled recirculated flue gas to the normal air flow to the fluidized bed instead of increasing air flow per se to increase the mass of flow of fluidizing medium, the increase in stack loss associated with increasing fluidizing mass flow is greatly reduced and the resultant loss in efficiency minimized.

At present, it is envisioned that upon initial start-up, air damper 42 will be set to a preselected position calculated to allow a predetermined mass of combustion air to flow to the combustor through inlet plenum 22 so as to maintain coal-air stoichiometry at a safe, efficient level. After air damper 42 has been positioned, gas damper 52 is also set at a preselected position calculated to allow sufficient mass flow of recirculated flue gas to inlet plenum 22 so the mass flow of fluidizing air and flue gas mixture maintains the bed within the operating temperature range at the design coal firing rate. Alternatively, gas damper 52 may be automatically controlled in response to bed temperature, as will be described hereinafter, if preferred.

One presently envisioned embodiment of the fluidized bed combustion system of the present invention is the fluidized bed residential heating system illustrated in the accompanying drawing. In response to a demand for heat, a demand signal 35 from a temperature sensing device (not shown) such as a room thermostat is sent to a controller 40. Upon receipt of the demand signal 35, the controller 40 generates a control signal 37 which is sent to circulating means 46 to initiate the flow of heat transfer fluid through heat exchanger 12. Controller 40 also generates and sends a control signal 39 to induced draft fan 16 and coal feeder motor 44 to initiate the supply of coal and fluidizing medium to the combustor.

Upon start-up of induced draft fan 16, the flow of fluidizing medium from inlet plenum 22 and thence upwardly through the combustion chamber 20 is initiated and the inert highly abrasive material making up the bed is fluidized thereby establishing a fluidized bed region 24 into which crushed coal is fed from storage hopper 30 through feeder 32. The crushed coal fed to the fluidized bed is circulated in the turbulent eddys present within the fluidized bed and mixed therethrough as it combusts.

Ignition, and therefore combustion, of the crushed coal upon entering the fluidized bed is ensured since the bed is, in accordance with the present invention, maintained at a preselected temperature above the ignition point of the coal during normal shutdown periods by means of heating means 34. If the system has been shutdown for a prolonged period of time, such as during summer shutdown, the bed must be preheated to a temperature above the ignition point of the coal before fluidizing the bed and admitting coal thereto. Again electric heating means 34 can be used thus completely eliminating the need for auxiliary fuels, such as oil or natural gas, for bed preheat.

The hot combustion gases generated by the combustion of the crushed coal within the fluidized bed pass upwardly out of combustor 10 and over heat exchanger 12 disposed downstream thereof to the stack. The gases are cooled and the heat exchange fluid heated as they pass in heat exchange relationship in heat exchanger 12. If a hot water residential heating system is desired, the heat transfer fluid is water and circulating means 46 comprises a typical water circulating pump. If a hot air residential heating system is desired, the heat transfer fluid is air and circulating means 46 comprises a forced draft fan. In either case, the hot fluid leaving heat exchanger 12 is circulated throughout the home via well-known conventional techniques.

A temperature sensor 60 is disposed at the outlet of heat exchanger 12 to monitor the temperature of the heat exchange fluid and sends a signal 61 indicative of the temperature of the heat exchange fluid temperature to controller 40. If the temperature of the heat exchange fluid exceeds a desired operating limit, controller 40 responds by sending a signal to coal feeder motor 44 and fan 16 to stop the feed of coal and fluidizing medium to the combustor 10. Once controller 40 receives a temperature signal 61 from temperature sensor 60 that the heat exchange fluid temperature has cooled back to a temperature below the desired operating limit, and there is still a demand for heat in the house, controller 40 sends a signal to coal feeder motor 44 and fan 16 to re-establish the feed of coal and fluidizing medium to the combustor.

Before being vented to the atmosphere via induced draft fan 16 through a chimney stack, the flue gas traverses particulate collector 14 disposed upstream with respect gas flow of the induced draft fan 16. As previously mentioned, coal ash residue formed during the combustion of the coal in the bed is continuously circulated within the bed until the ash residue is reduced to a fine particle from attrition against the highly abrasive inert particles forming the major constituent of the bed. The fine ash particles are entrained in the flue gas leaving the bed and carried to the particulate collector 14, such as but not limited to a mechanical cyclone-type collector, wherein the ash particles are removed from the flue gas and collected in the collector hopper for subsequent disposal.

Having traversed the particulate collector 14, the now substantially particulate-free, cooled flue gas is passed through induced draft fan 16 to raise the gas pressure to a level sufficient to vent the flue gas to the atmosphere. However, in accordance with the present invention, a portion of the substantially particulate-free, cooled flue gas is recycled back to the inlet plenum 22 to mix with the incoming combustion air. This mixture is then passed upwardly through the fluidizing region 24 of the combustor 10 to fluidize the coal particles and inert particles therein. As discussed previously, the recirculated flue gas serves to increase mass flow through the bed as a means of maintaining an operating temperature below the ash softening temperature while minimizing any loss in overal efficiency.

As noted previously, it is presently envisioned that flue gas damper 52 will be preset to regulate the flow of recirculated gas back to inlet plenum 22 at a predetermined flow calculated to yield the required mass flow of fluidizing medium through the combustor 10. Alternatively, the flow of recirculated flue gas may be selectively regulated in response to measured bed temperature.

In such a system, as shown in the drawing, a temperature probe 48 is disposed in the fluidizing region 24 of the combustion chamber 20 to monitor bed temperature and transmit a signal 41 indicative of the bed temperature to controller 50 wherein the measured bed temperature is compared to a preselected temperature within the desired operting range.

If the temperature of the bed in fluidizing region 24 rises above the preselected temperature, controller 50, in response to signal 41 indicative of the bed temperature, will selectively open gas recycle damper 52 to increase the flow of substantially particulate free, cooled flue gas from the outlet of induced draft fan 16 back to air plenum 22 wherein the flue gas mixes with incoming fluidizing air. The increased recycled flue gas flow passes upwardly through the fluidizing region 24 absorbing additional heat and thereby further cooling the bed as it traverses the fluidizing region 24. Likewise, if the bed temperature drops below the preselected temperature, controller 50 will selectively close damper 52 to decrease the flow of recycle flue gas to the bed. In this manner, the bed may be controllably cooled without the presence of heat transfer surface immersed within the bed.

In accordance with the present invention, the operating temperature range is selected to be at a level below the ash softening temperature characteristic of the coal being burned. This provides that only dry ash particles will be present in the bed which is necessary to ensure that attrition of the ash particles to a fine size by the highly abrasive inert particles will occur. A molten ash particle on the other hand would tend to stick to the abrasive inert particles rather than undergo attrition. Therefore, bed temperatures in excess of the ash softening temperature must be avoided.

As the combustor 10 is heavily insulated and uniquely designed as herein described to provide a substantially adiabatic combustion chamber therein, heat loss from the combustor would be minimal thereby ensuring that the temperature of the now slumped, i.e. non-fluidized, particle bed in the fluidizing region 24 would not decrease significantly during the normal shutdown periods experienced during the typicl cycling operation of a residential heating furnace. In accordance with the present invention, bed temperature is monitored during shutdown periods by probe 48. If the measured bed temperature drops below a preselected lower limit, controller 50, in response to a signal 41 from probe 48 indicative thereof, switches on electric heating means 34 immersed in the slumped bed to heat the bed so as to maintain the bed above the preselected lower limit which is set at a temperature above the ignition point of the coal being burned. Since the slumped bed is, according to the present invention, maintained above the ignition point, the combustor 10 can be rapidly started again simply by establishing fluidizing air flow therethrough and coal flow thereto as previously described.

Another important aspect of the present invention is the use of an induced draft fan to cause the recirculation of flue gas back to the combustor. Because an induced draft fan is utilized, the entire system is kept under negative pressure thereby ensuring that the recirculated flue gas will not leak back into the house. If a forced draft fan were used, the recirculated flue gas would be at positive pressure, i.e. above atmospheric pressure. In such a system, flue gas being recirculated to the combustor could leak into the house and asphyxiate its occupants.

In accordance with the present invention, there has been provided a coal-fired fluidized bed combustion system capable of rapid cycling operation in an on/off mode in a manner similar to that of conventional oil or gas fired furnaces. Because of the low inventory of fuel in the bed of inert particles, the energy loss during periods of shutdown is controlled to a minimum. In conventional coal-fired stoves used for home heating, there is a high fuel inventory in the stoves even during shutdown, the combustion of which cannot be controlled and energy waste results.

Although the fluidized bed system of the present invention is described herein as applied to residential home heating, it will be appreciated by those skilled in the art that the fluidized bed system of the present invention may readily adapted, with or without modification, for other applications such as industrial space heating, process heating or burning particulate fuels other than coal. Further, it is contemplated that certain aspects of the present invention may be applied to industrial and utility size fluidized beds to adapt same for cycling operation. Therefore, it is intended by the appended claims to cover all modifications which fall within the true spirit and scope of the invention as defined in the claims appended hereto.

We claim:

1. A fluidized bed combustion system for residential or industrial building heating comprising:
   a. a combustor having a chamber, said combustor being uncooled and insulated so as to provide a substantially adiabatic combustion chamber;
   b. a bed of highly abrasive inert refractory particles disposed within the combustion chamber;
   c. means for supplying an ash bearing particulate fuel to the bed of highly abrasive inert refractory particles for combustion therein to generate hot flue gas;
   d. an inlet air plenum disposed beneath the combustion chamber and connected to an air supply;
   e. a flue for venting the flue gas generated in the combustor to the atmosphere;
   f. a heat exchanger disposed in the flue downstream with respect to gas flow of the combustor;
   g. means for circulating a heat transfer fluid first through the heat exchanger in heat exchange relationship with the hot flue gas thereby cooling the flue gas and heating the heat exchange fluid and thence through the building to heat the building;
   h. a particulate collector disposed in the flue downstream of the heat exchanger and for removing any ash particles entrained in the cooled flue gas;
   i. a gas duct interconnecting the inlet air plenum with the flue at a location downstream of the particle collector;
   j. an induced draft fan disposed in the flue at a location downstream of the connection of the gas duct to the flue for drawing the flue gas through the flue and causing a portion of the flue gas to flow to the inlet air plenum and be drawn upwardly therefrom with air through the combustion chamber to fluidize the inert particles and the ash bearing particulate fuel therein;

k. damper means disposed within the gas duct and selectively positionable therein for regulating the flow of recirculated flue gas to the inlet air plenum;

l. means for positioning said damper means within the gas duct so as to regulate the flow of recirculated flue gas so as to maintain the temperature of the particulate bed below the ash softening temperature of the ash bearing particulate fuel; and m. an electric heating means disposed within the combustion chamber of the combustor and immersed within the particulate bed therein for maintaining the temperature of the bed above the ignition point temperature of the ash bearing particulate fuel during periods in which fuel is not being supplied to the combustor.

2. A fluidized bed combustion system for residential or industrial building heating as recited in claim 1 further comprising temperature sensing means immersed in the particulate bed with the combustion chamber for sensing the temperature of the bed of particulate material, the electric heating means being responsive to the sensed bed temperature so as to maintain the bed temperature above the ignition point temperature of the ash bearing particulate fuel and the damper positioning means being responsive to the sensed bed temperature so as to regulate the flow of recirculated flue gas to maintain the bed temperature below the ash softening temperature of the ash bearing particulate fuel.

* * * * *